United States Patent
Symons et al.

(10) Patent No.: US 8,438,060 B2
(45) Date of Patent: *May 7, 2013

(54) DYNAMIC ONLINE EXPERIENCE MODIFICATION AND INVENTORY OPTIMIZATION BASED ON STATISTICALLY SIGNIFICANT GEO-LOCATION PARAMETER

(75) Inventors: Matthew Symons, Oakland, CA (US); Miles Fender, Sonoma, CA (US); Piu Bose, Oakland, CA (US)

(73) Assignee: Accenture Global Services Limited, Dublin (IE)

( * ) Notice: Subject to any disclaimer, the term of this patent is extended or adjusted under 35 U.S.C. 154(b) by 462 days.

This patent is subject to a terminal disclaimer.

(21) Appl. No.: 12/366,133

(22) Filed: Feb. 5, 2009

(65) Prior Publication Data

US 2010/0094683 A1 Apr. 15, 2010

Related U.S. Application Data

(60) Provisional application No. 61/105,677, filed on Oct. 15, 2008.

(51) Int. Cl.
*G06Q 30/00* (2012.01)
(52) U.S. Cl.
USPC ............ 705/14.49; 705/14.41; 705/14.57
(58) Field of Classification Search ............... None
See application file for complete search history.

(56) References Cited

U.S. PATENT DOCUMENTS

| | | | |
|---|---|---|---|
| 6,665,715 | B1 | 12/2003 | Houri |
| 7,680,796 | B2 * | 3/2010 | Yeh et al. ............... 707/724 |
| 2002/0004754 | A1 * | 1/2002 | Gardenswartz et al. ........ 705/26 |
| 2002/0023000 | A1 | 2/2002 | Bollay |
| 2003/0065571 | A1 | 4/2003 | Dutta |
| 2003/0177139 | A1 | 9/2003 | Cameron et al. |
| 2003/0202009 | A1 | 10/2003 | Kasriel |
| 2004/0138943 | A1 | 7/2004 | Silvernail |
| 2004/0215517 | A1 | 10/2004 | Chen et al. |
| 2006/0011716 | A1 | 1/2006 | Perkowski |
| 2007/0100690 | A1 | 5/2007 | Hopkins |
| 2007/0198355 | A1 * | 8/2007 | Samson et al. ............... 705/14 |
| 2008/0004884 | A1 * | 1/2008 | Flake et al. ............... 705/1 |
| 2008/0005313 | A1 | 1/2008 | Flake et al. |
| 2008/0133342 | A1 * | 6/2008 | Criou et al. ............... 705/14 |
| 2008/0294596 | A1 | 11/2008 | Xiong |
| 2009/0240558 | A1 * | 9/2009 | Bandy et al. ............... 705/10 |

FOREIGN PATENT DOCUMENTS

KR 20020063008 A 8/2002

OTHER PUBLICATIONS

"European search report", European Patent Office, European Application No. 09012211.0, Jan. 8, 2010.

* cited by examiner

*Primary Examiner* — Fahd Obeid
(74) *Attorney, Agent, or Firm* — Mannava & Kang, P.C.

(57) ABSTRACT

An online experience of a user is dynamically configured at the micro-regional level based to achieve an objective associated with sales of a product. A catchment zone is determined, which identifies the geographic region associated with the objective and the product. The online user experience for users in the catchment zone is modified to achieve the objective.

19 Claims, 6 Drawing Sheets

DYNAMIC ONLINE EXPERIENCE MODIFICATION AND INVENTORY OPTIMIZATION BASED ON STATISTICALLY SIGNIFICANT GEO-LOCATION PARAMETER

PRIORITY

This application claims priority to U.S. provisional patent application Ser. No. 61/105,677, filed Oct. 15, 2008, and entitled "Dynamic Online Experience Modification and Inventory Optimization Based on Statistically Significant Geo-Location Parameter", which is incorporated by reference in its entirety.

BACKGROUND

In today's digital age, companies selling goods and services to consumers must engage in on-line marketing and sales over the Internet to be competitive. For example, many large department stores that traditionally have brick and mortar stores also have sophisticated web sites providing detailed product information and the ability for visitors to purchase products on-line. Furthermore, many companies have large marketing budgets directed to on-line marketing, including marketing on their web sites.

One of the key challenges facing these companies is how to evaluate their online marketing efforts. On-line activity, such as web site traffic and online sales may be used as a measure of online marketing efforts. However, on-line marketing may impact in-store sales as well as online sales. For example, a consumer may view product information on-line and then go to the brick and mortar store to see the product and ultimately purchase the product at the store. It is very difficult to track the impact of on-line marketing when purchases are made in this manner. To optimize marketing efforts and justify spending for on-line marketing, companies need to have the ability to accurately capture the impact of their on-line marketing efforts on offline sales.

To date, there is no structure in place that allows for formulating strategies around product offerings based on online activity and overall company key performance indicators (KPIs). Website owners typically operate within information silos and make isolated decisions around product and promotional offerings. As a result, promotional and product information content displayed on a website may be disconnected to the visitor's universe as often these products are either out of stock or promotions not available in the visitors geographic area. Eventually this causes an unfavorable consumer experience, and thus, there is a constant struggle by website owners to manage the relationship between visits to their website and offline outcomes.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

1. Overview

According to an embodiment, a smallest geo-location parameter having statistical significance for estimating the impact of online behavior on offline sales is determined. The smallest geo-location parameter is determined from the multiple granularities of geo-location parameters of the users. The smallest geo-location parameter is used to correlate online behavior with offline sales for the impact estimation. The determination of the smallest geo-location parameter is based on the statistical significance of the granularities of geo-location parameters. Statistical significance is associated with the statistical validity of data and may be dependent on determining the minimum sample or data points needed to avoid or minimize the probability of failing to detect real effects in the data. A statistically significant smallest geo-location parameter may be a granularity of the geo-location parameters for the users where there is sufficient online behavior data and offline data to detect or estimate the impact of the online behavior on the offline sales.

For example, online behavior is captured for a product for all the users in a particular zip code. If there is minimal offline sales data for the same product in that zip code, then the impact of the online behavior on the offline sales for the zip code cannot reliably be determined. However, offline sales data may be available for a region encompassing multiple zip codes. This region may then become the smallest geo-location parameter for correlating online and offline data to estimate impact.

Other variables besides quantity of online and offline data are used to determine the smallest geo-location parameter. These variables may include the type of product or brand, purchase cycle of the product, IP penetration (e.g., level of granularity for a geo-location parameter that can be determined by reverse IP lookup, frequency of site visits, conversion rate of the behavioral outcome that is being tracked/captured within the online data, retail/store density, website traffic, and seasonality factors such as time of year, holidays, etc.

According to embodiments, a system and method are provided that utilize online behavior, offline sales data, and the smallest geo-location parameter to modify a user's online experience (e.g., modify web page content, modify online promotions, etc.) at a micro-regional level to achieve a business objective. The objective may be broader or different from simply maximizing profit. The objective can include increasing yield or may generally be related to inventory control at the micro-regional level. Real-time stock keeping unit (SKU) data or other product inventory data is integrated with customer, online behavior from the Internet to dynamically target item availability in a particular region.

A user's online experience may be modified for a catchment zone. A catchment zone is a geographic area that is targeted based on the objective to be achieved. A catchment zone is determined from the smallest geo-location parameter of statistical significance or higher granularities of geo-location parameters that are also of statistical significance. Other factors related to achieving the objective may also be considered when selecting the catchment zone. For example, product inventory for a multi-zip-code region may need to be controlled. In that case, a multi-zip-code region of statistical significance is selected as the catchment zone, rather than a smallest geo-location parameter consisting of a single zip code.

The catchment zone and other factors are used to determine how to modify the user's online experience to achieve the objective. In one embodiment, modeling is used to determine potential modifications to the user's online experience to achieve the objective for the catchment zone. The modeling may include a historic analysis of how different modifications to the online experience have impacted offline sales and, based on this analysis, different modifications may be suggested and selected. Modifications may include modifying web page content to feature product, providing online promotions, including online advertising, for the product, providing email promotions for the product, etc. The modifications are made effective for users in the catchment zone to target a particular region.

In one example, a regional manager for technology stores within the San Francisco Bay Area reviews his inventory and realizes that he needs to make shelf space for a new shipment of a product and therefore has to move out the old stock for that product very quickly. The manager's objective at this point is to maximize the volume of sales of the existing product prior to the new shipment. A smallest geo-location parameter is determined for the product. A catchment zone is determined, which may be the smallest geo-location parameter or a larger granularity, which in this example is equivalent to the San Francisco Bay Area. Then, the website is modified for the San Francisco Bay Area to increase sales volume for the product. This may include changing the content of a web page to highlight the product, providing promotional information online for the product, creating an email, promotion campaign highlighting the product, etc.

Determination of the smallest geo-location parameter, the catchment zone, and the how to modify the online user experience is dynamic. They may change over time as variables and objectives change. Thus, websites may be continually optimized to maximize achievement of a business owner's objective at the micro-regional level.

Some terms used throughout the specifications are described as follows. Online behavior of users may include any measurable or trackable event of a user on the Internet. The online behavior is related to a product. This may include visits to web sites, frequency of pages visited, etc. Geo-location parameters for the users are also determined. A geo-location parameter is a geographic location for a user that has their on-line behavior captured. In one example, a geo-location parameter for a user is determined using a reverse Internet Protocol (IP) lookup. That includes determining the IP address of the user, and identifying a geographic location for the IP address, such as a zip code, city or some other location.

A user or a group of users may have multiple geo-location parameters. These multiple geo-location parameters are referred to as granularities. For example, a reverse IP address lookup may identify a smallest granularity geo-location parameter for the user, such as a zip code. Other higher granularities may be determined from the zip code. For example, a region may combine multiple neighboring zip codes. Another higher granularity may be a city or county having many regions. Yet another higher granularity may be a state, etc.

A product may be a single product or a group of products. For example, the product may be a facial cream or the product may be skin care products all sold under the same brand. The product may be a service, such as a cellular phone service being offered for sale. The product may be consumer goods or services.

2. System For Modifying Online User Experience

Figure 1:
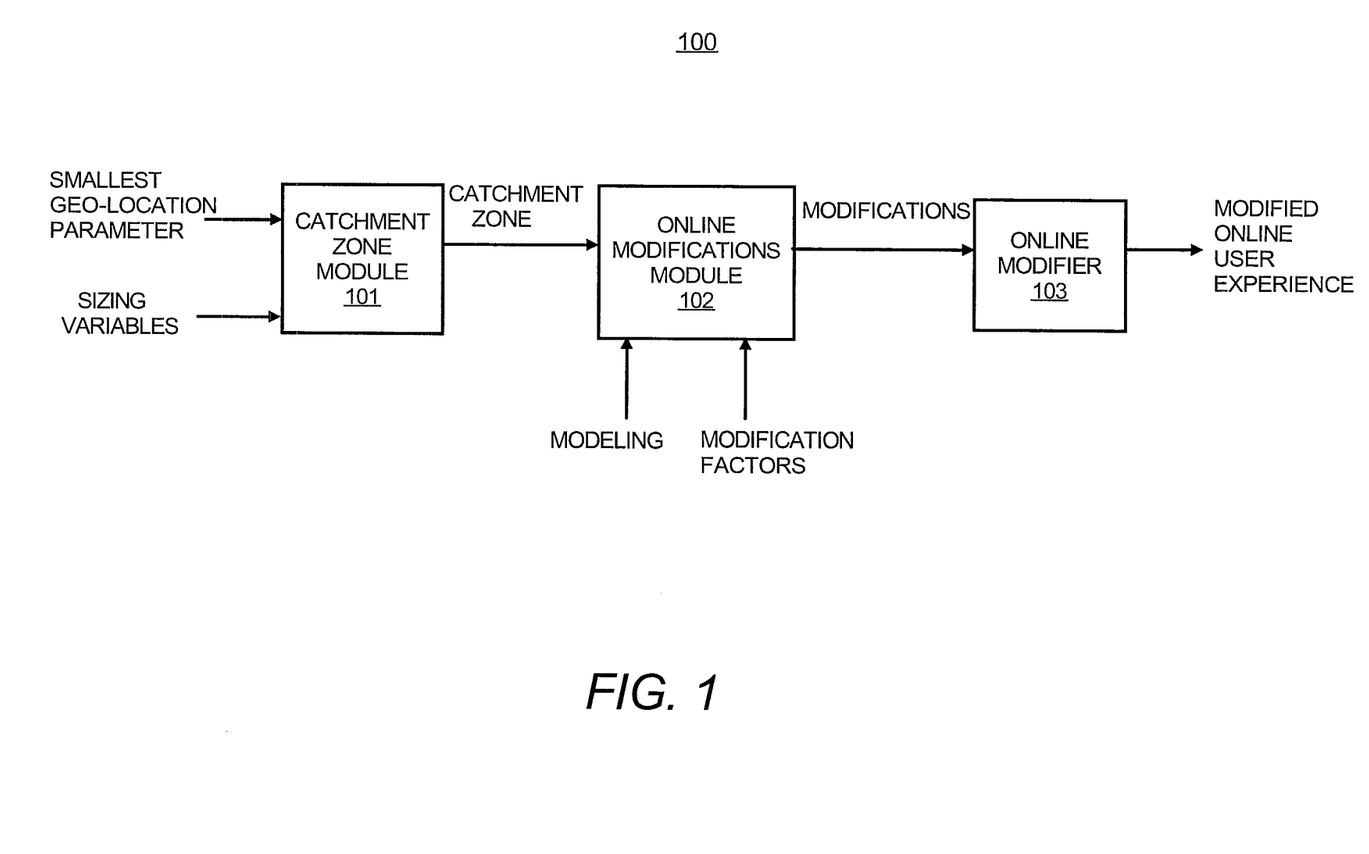
FIG. 1 illustrates a system for modifying an online user experience e method for determining a smallest geo-location parameter, according to an embodiment.

FIG. 1 illustrates a system 100, according to an embodiment. The system 100 includes a catchment zone module 101, an online modifications module 102, and an online modifier 103. The catchment zone module 101 determines the catchment zone for a product based on a smallest geo-location of statistical significance and other sizing variables. A sizing variable is any variable that can be used to determine the catchment zone. In one example, a sizing variable is specified by a user. As described in our example above, a regional manager for technology stores within the San Francisco Bay Area reviews his inventory and realizes that he needs to make shelf space for a new shipment of a product. In this example, the regional manager would specify a catchment zone of the San Francisco Bay Area. The catchment zone module 101 determines whether the smallest geo-location parameter of statistical significance or a higher granularity of the geo-location parameter of statistical significance is equivalent to the San Francisco Bay Area. If so, that geo-location parameter, which includes a multi-zip-code region, is selected as the catchment zone. Other sizing variables may also be used to determine the catchment zone.

The online modifications module 102 determines the modifications that need to be made to the online user experience in order to achieve the objective. The online modifications module 102 uses one or more of the catchment zone, and other modification factors including but not limited to the objective, online behavior, offline sales data, and user input to determine how to modify the online user experience to achieve the objective.

The online modifications module 102 may use modeling to make determinations on how to modify a website featuring the product or identify other online promotions that would have the greatest impact on achieving the objective. In one embodiment, modeling is used to determine potential modifications to the user's online experience to achieve the objective for the catchment zone. The modeling may include a historic analysis of how different modifications to the online experience have impacted offline sales and, based on this analysis, different modifications may be suggested and selected. Modifications may include modifying web page content to feature product, providing online promotions, including online advertising, for the product, providing email promotions for the product, etc. The modifications are made effective for users in the catchment zone to target a particular region.

A marketing return on investment (MROI) model may be used for the modeling. The MROI model is an econometric model that isolates the effects of online behavior on offline sales for the smallest geo-location parameter. The MROI model may include years of sales and marketing data to increase accuracy and to accommodate variables such as seasonality, etc. From the historical sales and marketing data, marketing response curves are created by calculating the relationship between different types of marketing and sales in order to find a return on investment for different types of marketing. A financial model converts these response curves into net revenues. The different types of marketing are implemented as modifications to the user's online experience for the catchment zone in order to achieve the objective.

After the modifications to the online user experience are determined, the online modifier 103 implements the modifications. In one example, this may include providing modified web pages in a web site for users within the catchment zone. For example, a user is visiting the website for the technology stores. The website determines the zip code of the user, for example, through a reverse IP lookup. If the user is in the catchment zone, modified web pages or online promotions featuring the product, which may have been created and stored using the online modifier 103, are provided to the user from a web server. In another example, advertising for the product is provided on the website if the user is in the catchment zone.

3. System For Determining Smallest Geo-Location Parameter

Figure 2:
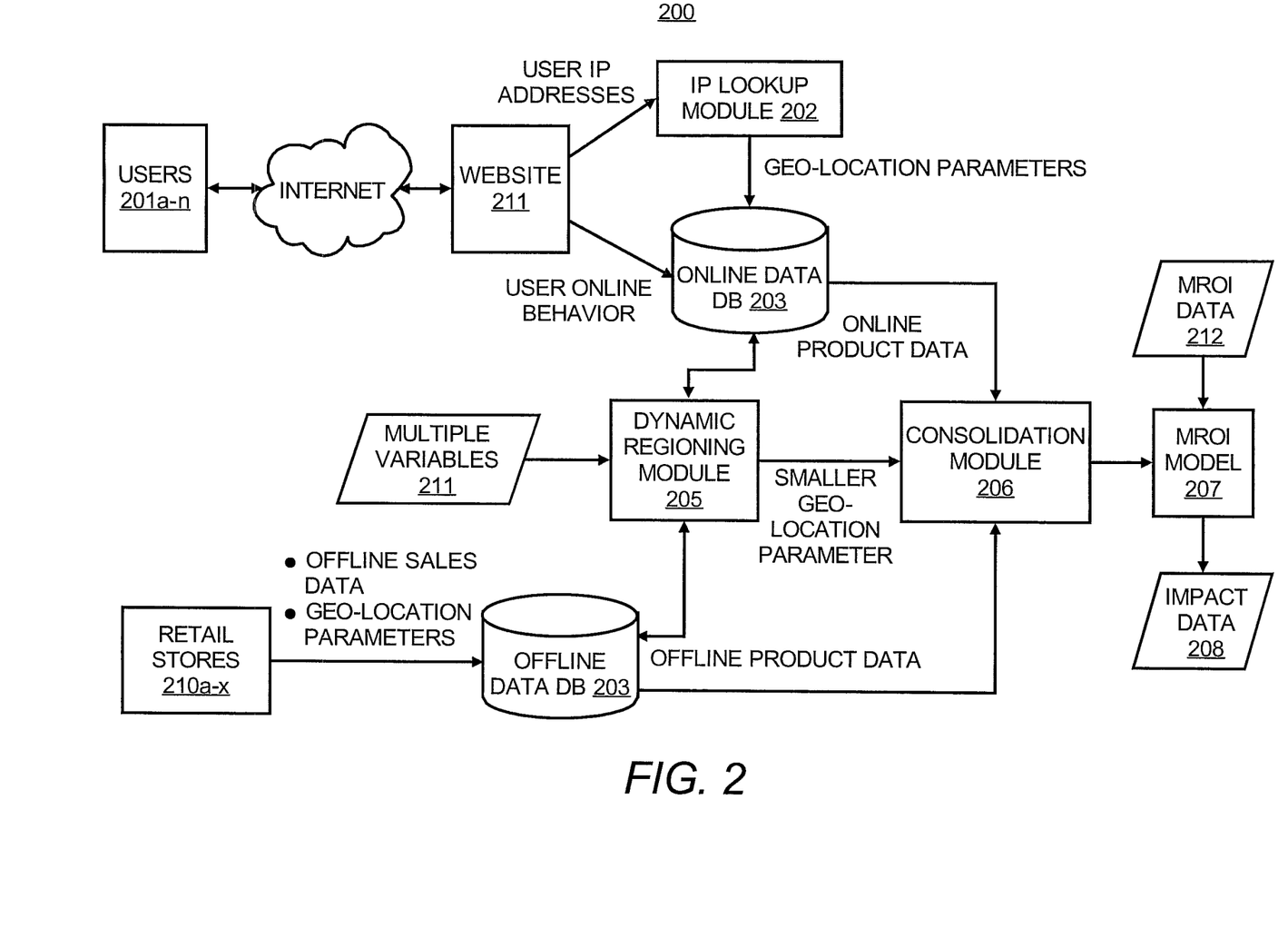
FIG. 2 illustrates a system for determining a smallest geo-location parameter, according to an embodiment.

As described above, the catchment zone module 101 and other modules of the system 100 may use a smallest geo-location parameter of statistical significance as input. FIG. 2 describes a system 200 for determining a smallest geo-location parameter of statistical significance.

The geo-location parameter for each user is stored in an online data database (DB) 203. The online data DB 203 stores the on-line behavior captured for each user along with the corresponding geo-location parameter. The online behavior data with the corresponding geo-location parameters are used as an input to a dynamic regioning module 205.

In addition to online behavior data, the system 200 captures offline data. Retail stores 210a-x capture offline sales data and corresponding geo-location parameters for the offline sales, such as store locations where sales are made. An offline data DB 204 stores the offline sales data and the corresponding geo-location parameters.

The online and offline data may be captured and stored for many products continuously or periodically. If the impact of online behavior on offline sales needs to be determined for a particular product, the online and offline data for the product is sent to the dynamic regioning module 205. For example, the dynamic regioning module 205 retrieves the online and offline product data from the DBs 203 and 204. Then, using that data and other variables 211, the dynamic regioning module 205 determines the smallest geo-location parameter that is statistically significant for estimating the impact of online behavior on offline sales for the product. The dynamic regioning module 205 may use the method 100 to determine the smallest geo-location parameter that is statistically significant. The variables 211 for this determination may include the type of product or brand, purchase cycle of the product, IP penetration (e.g., level of granularity for a geo-location parameter that can be determined by reverse IP lookup, frequency of site visits, conversion rate of the behavioral outcome that is being tracked/captured within the online data, retail/store density, website traffic, and seasonality factors such as time of year, holidays, etc.

A consolidation module 206 consolidates all the online and offline product data for the smallest geo-location parameter. The online and offline product data, for example, is retrieved from the DBs 203 and 204. An MROI model 207 uses the consolidated data and MROI data 212, such as information on marketing campaigns, competitor behavior for the region, demographics, etc. The MROI model 207 generates impact data 208, which includes an estimation of how online behavior impacts offline sales for the product. The system 200 may be used to determine impact data 208 periodically or continuously.

Figure 3:
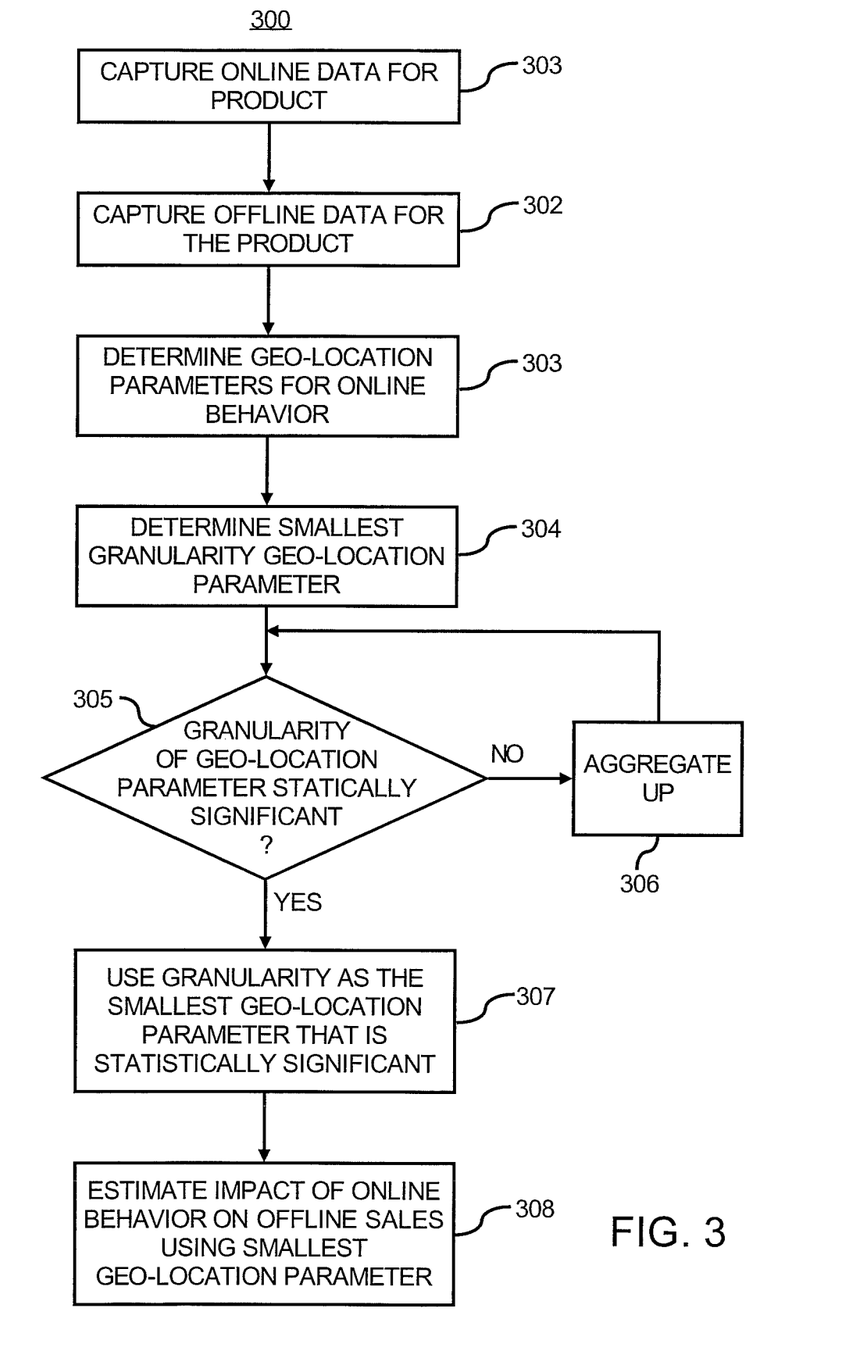
FIG. 3 illustrates a method for determining a smallest geo-location parameter, according to an embodiment.

4. Method for Determining Smallest Geo-Location Parameter of Statistical Significance FIG. 3 illustrates a method 300 for determining a smallest geo-location parameter, according to an embodiment. At step 301, online behavior is captured for a product. The online behavior includes events monitored on the Internet, such as web site traffic at the product's web site, click-throughs for online advertisements or coupons, etc. The online behavior is stored, for example, in a database.

At step 302, offline data for the product is captured. This includes in-store sales of the product, use of coupons for the purchase of the products, or any events that are not online and related to sales of the product. The offline data is stored.

At step 303, geo-location parameters for the on-line behavior are determined. This may include multiple granularities of geo-location parameters for users performing the events captured as the online behavior. The smallest granularity may include a set of blocks in a city or may be a zip code. Larger granularities may include a set of zip codes, a set of cities, or a state-level granularity. The smallest granularity may be dependent on the geo-location parameter data that is available for a user. For example, a reverse IP lookup is performed to determine the smallest granularity. The geo-location data available for a reverse IP lookup may vary by region. For more densely populated regions, such as a large city, the IP address of a user may be cross-referenced to a set of city blocks. For more sparsely populated areas, the user's IP address may be cross-referenced to a single zip code or to a larger region.

At step 304, the smallest granularity geo-location parameter is determined from step 303.

At step 305, a determination is made as to whether the smallest granularity geo-location parameter determined at step 304 is statistically significant for estimating the impact of online behavior on offline sales for the product. A number of variables, such as quantity of online behavior data and quantity of offline data for the smallest granularity geo-location parameter, which is determined from data captured at steps 303 and 302, and other variables, are used to evaluate statistical significance.

If the smallest granularity geo-location parameter is determined not to be statistically significant at step 305, then the geo-location parameter is aggregated up at step 306, and step 305 is repeated. Aggregating up includes determining a next highest granularity geo-location parameter of the geo-location parameters determined at step 303. The different granularities may be predetermined, e.g., city block, zip code, region of zip codes, and state. Starting from the smallest granularity, the online behavior data can be aggregated to the next highest granularity, and so on. For example, all the online behavior data is stored for a particular group of city blocks. To determine the online behavior data for the next highest granularity, such as a zip code including multiple groups of city blocks, the online behavior data is aggregated for all the groups of city blocks in the zip code. This aggregation may include associating all the online behavior data for each user in the groups of city blocks to the zip code. The zip code can be used as an index to determine all the online behavior data for the product in the zip code. The online behavior data for the zip code may then be used to determine whether the zip code is statistically significant for estimating the impact of online behavior on offline sales for the product at step 305. This aggregation is repeated until a statistically significant geo-location parameter granularity is determined.

At step 307, after a statistically significant granularity of the geo-location parameters is determined, that granularity is used as the smallest granularity geo-location parameter for estimating the impact of online behavior on offline sales for the product. At step 308, marketing research on investment (MROI) econometric modeling may be used to estimate the impact of online behavior on offline sales for the product. The inputs to the modeling include the online behavior data and the offline data for the smallest geo-location parameter data. Other inputs for the modeling may include information on marketing campaigns, competitor behavior for the region, demographics, etc. The MROI model may include historical data for marketing on the resulting impact of the marketing.

The method 300 is not just performed for a snapshot of online and offline data. Instead, the online and offline data are continuously or periodically captured and used to determine the smallest geo-location parameter continuously or periodically. As a result, the smallest geo-location parameter for a product may change over time due to varying online and offline data.

4. Method For Modifying Online User Experience For A Catchment Zone

Figure 4:
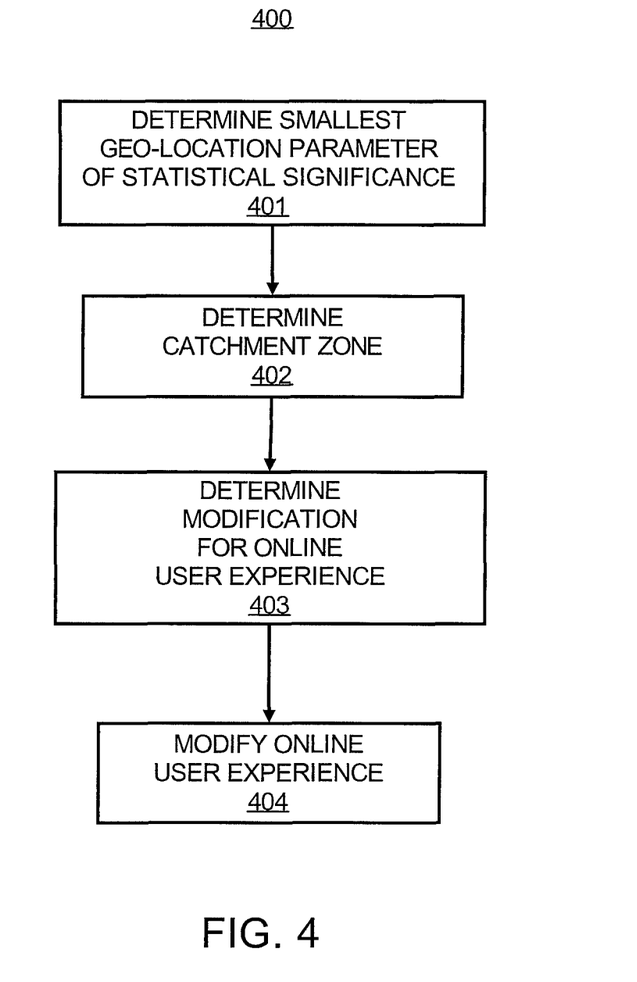
FIG. 4 illustrates a method for modifying an online user experience for a catchment zone.

FIG. 4 illustrates a method 400 for modifying an online user experience for a catchment zone, according to an embodiment. At step 401, a smallest geo-location parameter of statistical significance is determined for a product. The steps of the method 300 describe determining the smallest geo-location parameter.

At step 402, a catchment zone from the smallest geo-location parameter is determined. The catchment zone may be the smallest geo-location parameter or may be higher granularity geo-location parameter. For example, if the smallest geo-location parameter is a zip code, the catchment zone may be the zip code or may be a larger region including the zip code, such as a multi-zip-code region of statistical significance. In addition to the smallest geo-location parameter, the catchment zone may be determined using other factors that impact size of the region, such as user input pertaining to the catchment zone of interest, the objective to be achieved by modifying the online user experience (e.g., inventory control for a particular area), etc.

At step 403, a determination is made on how to modify the online user experience related to the product for the catchment zone in order to achieve the objective. For example, the online modifications module 102 shown in FIG. 1 may use modeling to make determinations on how to modify a website featuring the product or identify other online promotions that would have the greatest impact on achieving the objective.

At step 404, the modifications to the online user experience for the catchment zone are implemented. In one example, this may include providing modified web pages in a web site for users within the catchment zone. For example, a user is visiting the website for the technology stores. The website determines the zip code of the user, for example, through a reverse IP lookup. If the user is in the catchment zone, modified web pages or online promotions featuring the product, which may have been created and stored using the online modifier 103, are provided to the user from a web server. In another example, advertising for the product is provided on the website if the user is in the catchment zone.

5. Method For Providing Inventory Control For A Catchment Zone

Figure 5:
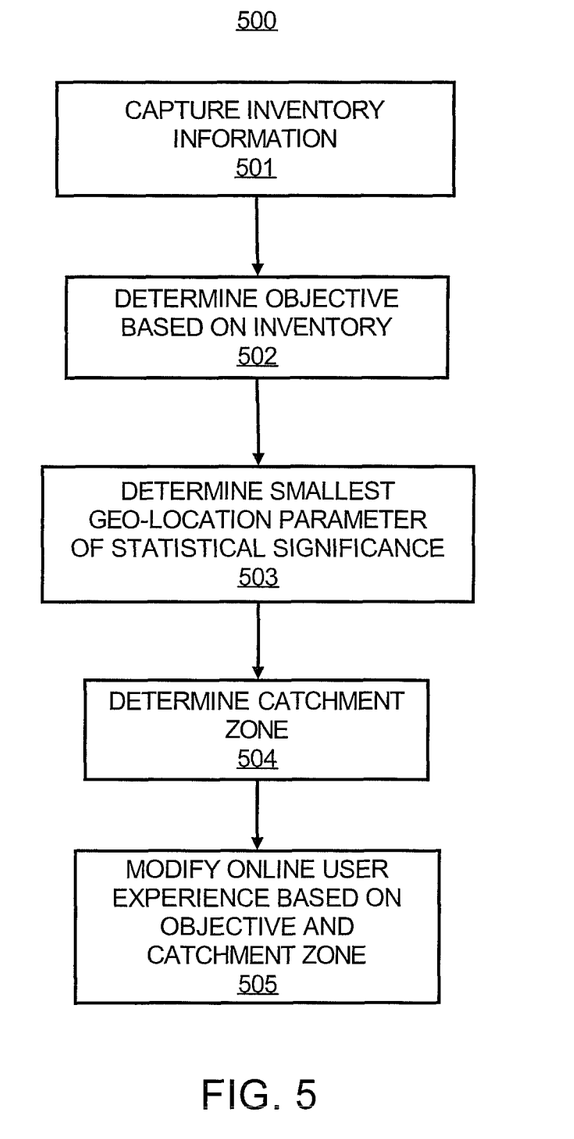
FIG. 5 illustrates a method for providing inventory control in a catchment zone, according to an embodiment.

FIG. 5 illustrates a method 500 for providing inventory control in a catchment zone, according to an embodiment. At step 501, inventory information for a product is captured. This may include SKU data or other product tracking data.

At step 502, an objective is determined based on the inventory information. One example of an objective is to maximize the volume of sales of the existing product prior to receiving new shipment of the product. In another example, the inventory information indicates that a product is exceeding its average shelf life. Then, that product may be given higher priority over other products for increasing sales. Also, the objective is applicable to a particular region. For example, the inventory information may reflect product data within a multi-zip-code region.

At step 503, a smallest geo-location parameter of statistical significance is determined, such as described above with respect to the method 300.

At step 504, a catchment zone is determined from the smallest geo-location parameter and the region applicable to the objective. For example, the catchment zone may be a granularity of the smallest geo-location parameter and also encompasses the region applicable to the objective. Step 402 of the method 400 describes determining a catchment zone.

At step 505, an online user experience is modified in order to control inventory of the product for the catchment zone.

6. Computer Readable Medium

Figure 6:
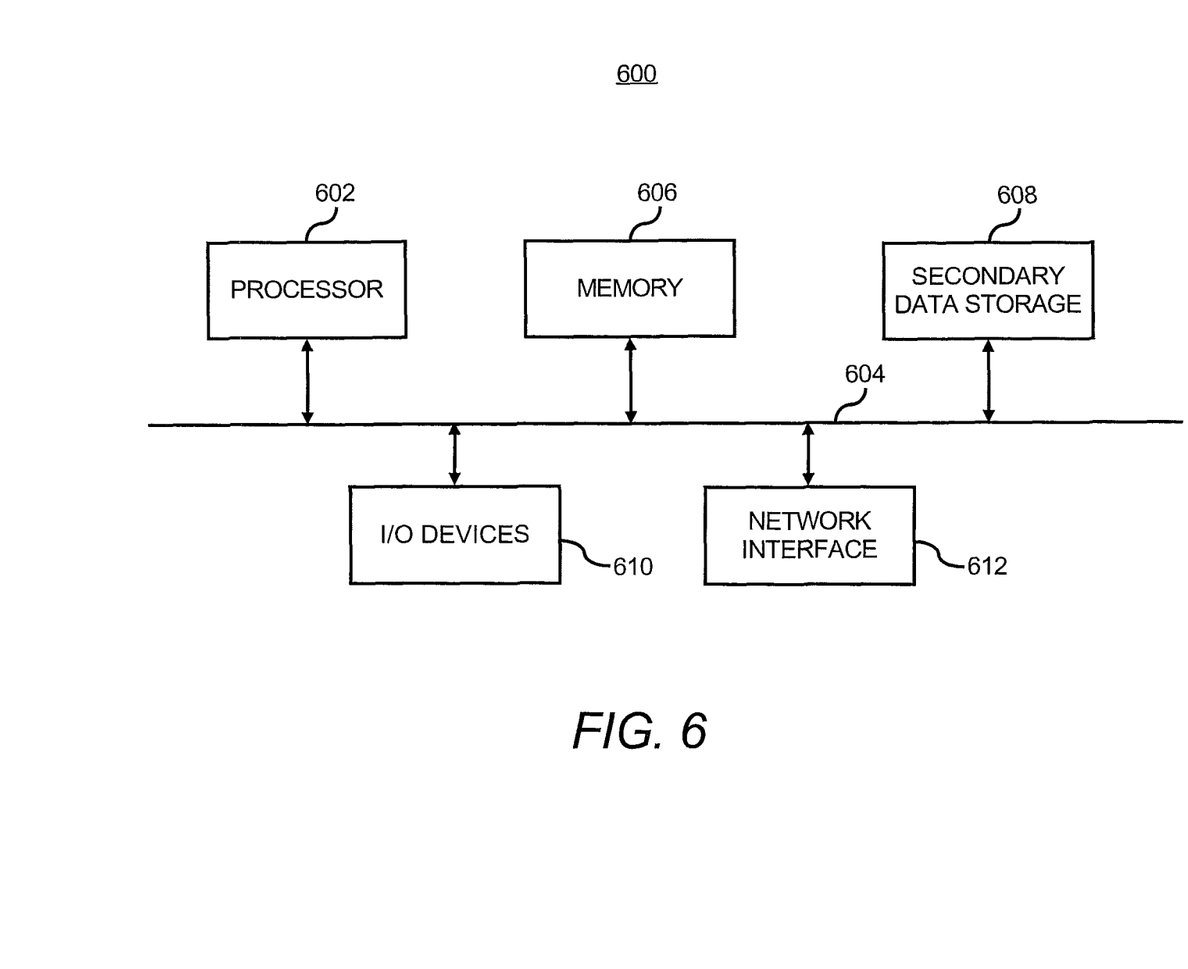
FIG. 6 illustrates a computer system that may be used for the methods and systems of FIGS. 1-5, according to an embodiment.

FIG. 6 shows a computer system 600 that may be used with the embodiments described herein. The computer system 600 represents a generic platform that includes components that may be in a server or other computer system. The computer system 600 may be used as a platform for executing one or more of the methods, functions, modules, and other steps described herein. These steps may be embodied as software stored on one or more computer readable mediums.

The computer system 600 includes a processor 602 that may implement or execute software instructions performing some or all of the methods, functions and other steps described herein. Commands and data from the processor 602 are communicated over a communication bus 604. The computer system 600 also includes a main memory 606, such as a random access memory (RAM), where the software and data for processor 602 may reside during runtime, and a secondary data storage 608, which may be non-volatile and stores software and data. The memory and data storage are examples of computer readable mediums.

The computer system 600 may include one or more I/O devices 610, such as a keyboard, a mouse, a display, etc. The computer system 600 may include a network interface 612 for connecting to a network. It will be apparent to one of ordinary skill in the art that other known electronic components may be added or substituted in the computer system 600.

One or more of the steps of the methods described herein and other steps described herein and one or more of the components of the systems described herein may be implemented as computer code stored on a computer readable medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A system for dynamically determining modifications for online experiences based on an objective associated with sales of a product, the system comprising:
   data storage to store online behavior data and offline sales data used to determine a smallest geo-location parameter of statistical significance;
   a dynamic regioning module executed by a processor to
      determine online behavior of users, wherein the online behavior is related to the product,
      determine granularities of a geo-location parameter for the on-line behavior of users,
      determine a smallest granularity of the granularities of the geo-location parameter,
      determine whether the smallest granularity is statistically significant for estimating an impact of the online behavior on offline sales of the product based on the online behavior data and the offline sales data and one or more parameters associated with the online behavior and offline sales,
      in response to a determination that the smallest granularity is statistically significant, use the smallest granularity as the smallest geo-location parameter, and
      in response to a determination that the smallest granularity is not statistically significant, repeatedly determine whether a next higher granularity of the granularities is statistically significant until a granularity of statistical significance is determined, and select the statistically significant granularity as the smallest geo-location parameter;
   a catchment zone determination module, executed by the processor, to determine a catchment zone, wherein the catchment zone is a geographic area that is targeted based on the objective, and the catchment zone determination module is operable to modify the catchment zone based on the smallest geo-location parameter; and
   an online modifications module, executed by the processor, to determine one or more modifications to the online user experience for the catchment zone to achieve the objective.

2. The system of claim 1, wherein the online modifications module uses marketing return on investment (MROI) modeling to determine an impact of online behavior on offline sales of the product and to identify modifications to the online user experience for the catchment zone.

3. The system of claim 1, further comprising:
   an online modifier implementing the one or more modifications to the online user experience for each user determined to be in the catchment zone.

4. The system of claim 3, wherein the one or more modifications to the online user experience comprise modified web pages and modified online promotions.

5. The system of claim 1, wherein the dynamic regioning module determines whether the smallest granularity is statistically significant from a minimum number of data points for the online behavior data and the offline sales data that are needed to avoid or minimize a probability of failing to detect real effects of the online behavior on the offline sales for the smallest granularity.

6. A method to dynamically determine modifications for online experiences based on an objective, the method comprising:
   storing online behavior data and offline sales data of a product to determine online behavior of users, wherein the online behavior is related to the product;
   determining, by a processor, granularities of a geo-location parameter for on-line behavior of users;
   determining a smallest granularity of the granularities of the geo-location parameter;
   determining whether the smallest granularity is statistically significant for estimating an impact of the online behavior on offline sales of the product based on the online behavior data and the offline sales data and one or more parameters associated with the online behavior and offline sales;
   in response to determining the smallest granularity is statistically significant, using the smallest granularity as a smallest geo-location parameter;
   in response to determining the smallest granularity is not statistically significant, repeatedly determining whether a next higher granularity of the granularities is statistically significant until a granularity of statistical significance is determined, selecting the statistically significant granularity as the smallest geo-location parameter;
   determining a catchment zone, wherein the catchment zone is a geographic area that is targeted based on the objective;
   modifying, by the processor, the catchment zone based on the smallest geo-location parameter; and
   determining one or more modifications to an online user experience related to the product and for the catchment zone.

7. The method of claim 6, wherein the objective is associated with controlling inventory for the product, and the method comprises:
   determining inventory of the product for stores in the catchment zone, wherein the one or more modifications are modifications to the online user experience for the catchment zone to control the inventory of the product.

8. The method of claim 7, wherein the one or more modifications include modifications for a website and the modifications are implemented only for visitors to the web site determined to be in the catchment zone.

9. The method of claim 8, wherein the one or more modifications to the web site include at least one of changing contents of web pages at the website and the method comprises providing online promotions of the product at the web site.

10. At least one computer readable medium storing computer code that when executed on one or more computer systems is to:
   determine granularities of a geo-location parameter for on-line behavior of users, wherein the on-line behavior is related to a product;
   determine a smallest granularity of the granularities of the geo-location parameter;
   determine whether the smallest granularity is statistically significant for estimating an impact of the online behavior on offline sales of the product based on one or more parameters associated with the online behavior and offline sales of the product;
   in response to determining the smallest granularity is statistically significant, use the smallest granularity as a smallest geo-location parameter;
   in response to determining the smallest granularity is not statistically significant, repeatedly determine whether a next higher granularity of the granularities is statistically significant until a granularity of statistical significance is determined, and select the statistically significant granularity as the smallest geo-location parameter;

determining a catchment zone, wherein the catchment zone is a geographic area that is targeted based on the objective;

modify the catchment zone based on the smallest geo-location parameter; and modify an online user experience related to the product for the catchment zone.

11. The at least one computer readable medium of claim 10, wherein the objective is associated with controlling inventory for the product, and code is to:

determine inventory of the product for stores in the catchment zone; and modify an online user experience for the catchment zone to control the inventory of the product.

12. The at least one computer readable medium of claim 11, wherein the code to modify an online user experience is to:

determine whether a visitor to a web site is in the catchment zone; and modify the web site to control the inventory of the product if the user is in the catchment zone.

13. The at least one computer readable medium of claim 12, wherein the code to modify the web site is to:

change contents of web pages at the website.

14. The at least one computer readable medium of claim 12, wherein the code to modify the web site is to:

provide online promotions of the product at the website.

15. The at least one computer readable medium of claim 10, wherein the code to modify the catchment zone is to:

identify the smallest geo-location parameter as the catchment zone if the determined catchment zone is smaller than the smallest geo-location parameter.

16. The at least one computer readable medium of claim 10, wherein the catchment zone is a granularity larger than the smallest geo-location parameter.

17. The at least one computer readable medium of claim 10, wherein the code to determine the smallest geo-location parameter further is to:

dynamically determine the smallest geo-location parameter as online and offline product data and one or more of the variables vary over time.

18. The at least one computer readable medium of claim 10, wherein the code to modify an online user experience related to the product and for the catchment zone is to:

dynamically modify the online user experience as online behavior and offline sales data and the objective vary over time.

19. The at least one computer readable medium of claim 10, wherein the code is to:

determine one or more modifications to the online user experience based on marketing return on investment (MROI) modeling.

* * * * *